UNITED STATES PATENT OFFICE.

HIRAM L. HALL, OF BEVERLY, MASSACHUSETTS, ASSIGNOR TO THE BEVERLY RUBBER COMPANY, OF SAME PLACE.

IMPROVEMENT IN RESTORING WASTE VULCANIZED RUBBER.

Specification forming part of Letters Patent No. 22,217, dated November 30, 1858.

*To all whom it may concern:*

Be it known that I, HIRAM L. HALL, of Beverly, in the county of Essex and State of Massachusetts, have invented a new and useful improvement in the process of restoring waste vulcanized or hard india-rubber—that is to say, such rubber which, being once cured or prepared by any of the processes described in the Letters Patent of the United States granted to Charles Goodyear, or any other processes applied for similar purposes, has by any reason become waste or useless, or having been manufactured into car-springs, shoes, packing, canes, and other fabrics and substances, has served its purpose, or been heretofore deemed as having served its purpose, or been deemed to have become for any other cause unfit for the purpose of use, wearing, trade, or commerce—to such a soft, plastic, or gummy state that it may be used again in the manufacture of india-rubber substances and fabrics; and that the following is a full and exact specification of my said improvement, by which my process may be distinguished from all others for a similar purpose, together with the points therein which I claim and desire to have secured to me by Letters Patent.

Various processes have been recently had, some of which have been patented, for restoring waste vulcanized rubber to a soft, plastic, or gummy state; but some of them are too expensive to be extensively used in practice, requiring great care from experienced chemists, and others bring out but imperfect results.

The essential feature of my improved process consists in submitting the waste vulcanized rubber which it is desired should be restored as aforesaid to the operation of steam in a close or any proper vessel of any description, after thoroughly grinding it between fluted or scored rollers, or what are known as "mullers," or in any other manner which will reduce the material to a finely-divided state. By submitting the mass thus treated to steam, in connection with water or not, as may be most convenient, for about forty-eight hours, it becomes reduced to a plastic or gummy state, fit for use again in the manufacture of india-rubber fabrics in a most simple and economical manner.

I have already obtained Letters Patent, issued January 19, 1858, to the Beverly Rubber Company, as my assignee, for the process of restoring waste vulcanized rubber by boiling it in hot water, and my present application is for an improvement upon that process. The restoration in that case is effected by hot water, and in my present process by the heated vapors of water applied directly to the rubber.

I wish to be understood as not confining my above-described process of restoring to waste vulcanized india rubber alone, as it is equally applicable and with the same advantages to waste vulcanized goods made of gutta-percha and other vulcanizable gums, whether combined or not combined with india-rubber or caoutchouc. Neither do I limit myself to any particular number of hours in steaming, or to any particular degrees of pressure of steam, as those may be varied according to the nature, substance, and composition of the material to be treated; but I have described in general terms what I have found to produce the best results.

Having thus fully described my improvements, what I claim as my invention, and desire to have secured to me by Letters Patent, is—

The method of restoring waste vulcanized rubber by grinding it to a fine or powdered state or otherwise, then submitting the same in a close or proper vessel to the action of steam direct upon the rubber, or in connection with water, for the space of forty-eight hours, more or less.

HIRAM L. HALL.

Witnesses:
JOHN A. GREENE,
JAMES H. KENDALL.